(12) United States Patent
Tang

(10) Patent No.: US 11,149,789 B2
(45) Date of Patent: Oct. 19, 2021

(54) SLIDE RAIL

(71) Applicant: HONGFUJIN PRECISION ELECTRONICS(TIANJIN)CO., LTD., Tianjin (CN)

(72) Inventor: Chen-Sheng Tang, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 16/747,107

(22) Filed: Jan. 20, 2020

(65) Prior Publication Data

US 2021/0148404 A1 May 20, 2021

(30) Foreign Application Priority Data

Nov. 14, 2019 (CN) .......................... 201911112146.4

(51) Int. Cl.
| | |
|---|---|
| *A47B 88/443* | (2017.01) |
| *F16C 29/02* | (2006.01) |
| *F16C 29/00* | (2006.01) |
| *A47B 88/44* | (2017.01) |
| *A47B 88/49* | (2017.01) |

(52) U.S. Cl.
CPC .............. *F16C 29/02* (2013.01); *A47B 88/44* (2017.01); *A47B 88/443* (2017.01); *F16C 29/005* (2013.01); *A47B 88/49* (2017.01); *A47B 2210/007* (2013.01); *A47B 2210/0016* (2013.01); *A47B 2210/0081* (2013.01)

(58) Field of Classification Search
CPC ....... A47B 88/40; A47B 88/44; A47B 88/443; A47B 88/49; F16C 29/02; F16C 29/005

USPC ....... 312/330.1, 334.1, 334.7, 334.8, 334.44, 312/334.46

See application file for complete search history.

(56) References Cited

U.S. PATENT DOCUMENTS

| | | | | | |
|---|---|---|---|---|---|
| 7,140,704 | B2 * | 11/2006 | Chen | ..................... | A47B 88/493 312/334.44 |
| 8,585,166 | B2 * | 11/2013 | Chen | ..................... | A47B 88/493 312/334.46 |
| 9,939,014 | B1 * | 4/2018 | Chiu | ....................... | F16C 29/02 |
| 2014/0339973 | A1 * | 11/2014 | Fan | ....................... | A47B 88/493 312/333 |

FOREIGN PATENT DOCUMENTS

TW          201542074 A       11/2015

* cited by examiner

*Primary Examiner* — James O Hansen
(74) *Attorney, Agent, or Firm* — ScienBiziP, P.C.

(57) ABSTRACT

A slide rail includes a first rail, a second rail, and a third rail. The first rail is slidably coupled to the second rail. The second rail is slidably coupled to the third rail. The first rail includes a pulling tab. The second rail includes a first resilient piece and a first clearance slot. The third rail includes a positioning slot. One end of the first resilient piece is fixed to the second rail, and another end of the first resilient piece extends into the first clearance slot. When the first rail slides out, the pulling tab drives the first resilient piece and the second rail to slide out. When the first resilient piece is moved to the positioning slot, the first resilient piece resiliently bends and inserts into the positioning slot, and the first resilient piece is separated from the pulling tab.

11 Claims, 8 Drawing Sheets

SLIDE RAIL

FIELD

The subject matter herein generally relates to a slide rail, and more specifically to an extendable slide rail.

BACKGROUND

Generally, extendable slide rails have problems of a poor connection of multiple slide rails during an extension process and a poor stability of extension.

BRIEF DESCRIPTION OF THE DRAWINGS

Implementations of the present disclosure will now be described, by way of embodiments, with reference to the attached figures.

DETAILED DESCRIPTION

Figure 1:
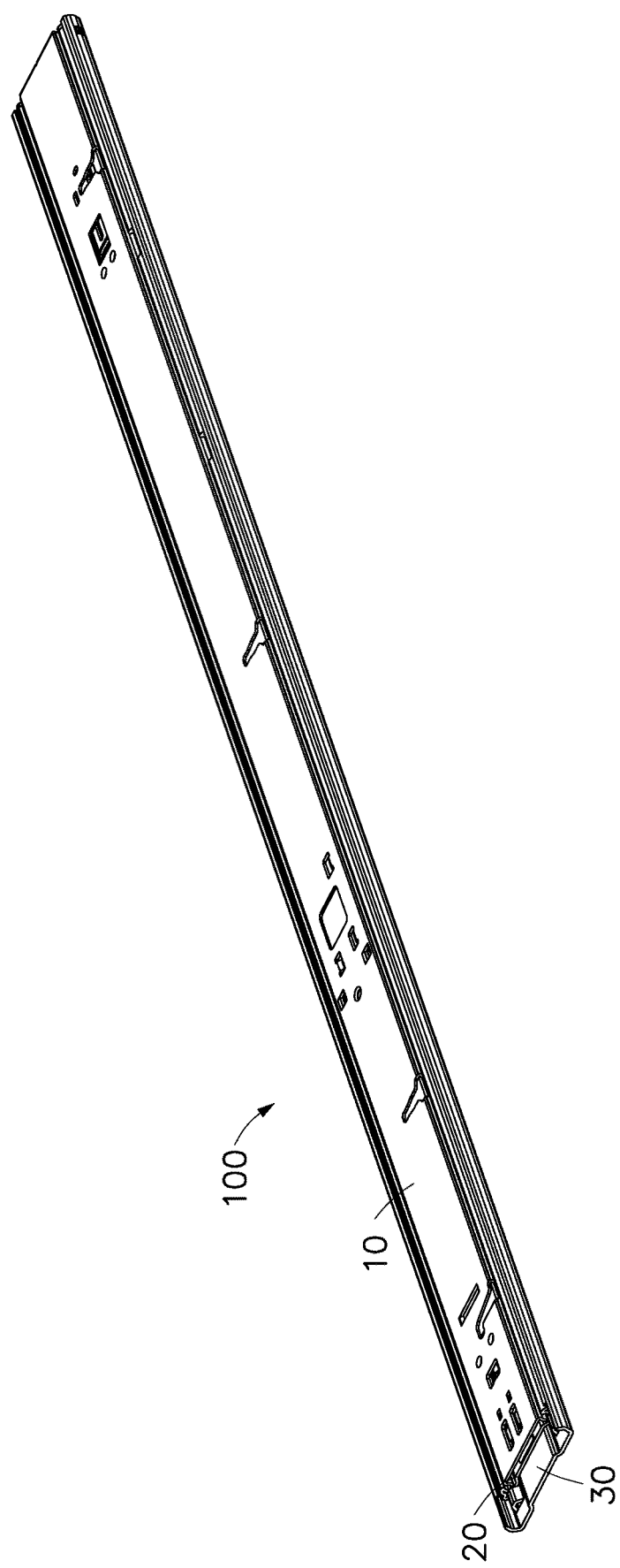
FIG. 1 is an assembled, isometric view of an embodiment of a slide rail.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

Figure 2:
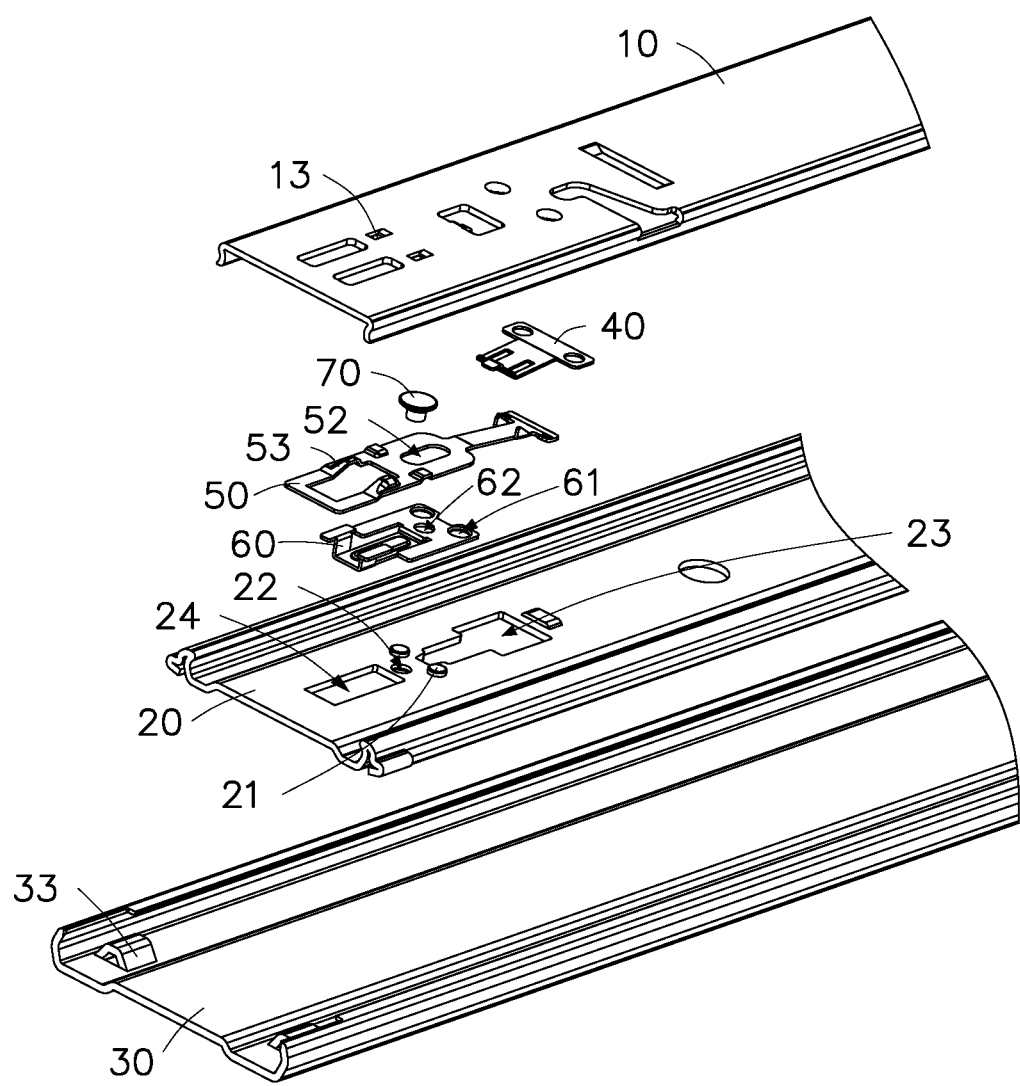
FIG. 2 is a partial exploded, isometric view of the slide rail in FIG. 1.
Figure 6:
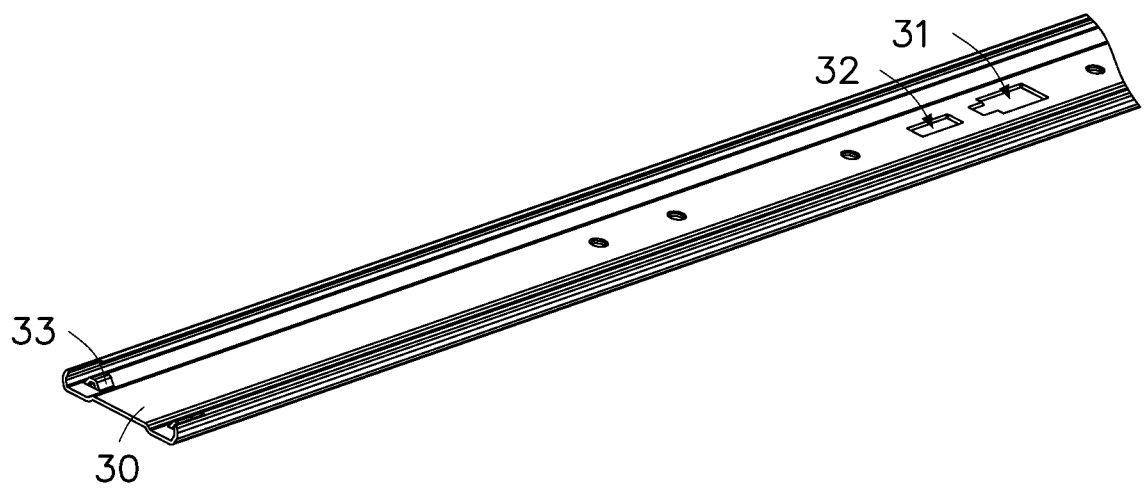
FIG. 6 is an isometric view of the third rail.

FIG. 1, FIG. 2, and FIG. 6 show an embodiment of a slide rail 100 including a first rail 10, a second rail 20, a third rail 30, a pulling tab 40, and a first resilient piece 50. The first rail 10 is slidably mounted on the second rail 20, and the second rail 20 is slidably mounted on the third rail 30. The pulling tab 40 is fixed to a side of the first rail 10 adjacent to the second rail 20. The first resilient piece 50 is fixed to a side of the second rail 20 adjacent to the first rail 10. The second rail 20 is provided with a first clearance slot 23. The third rail 30 is provided with a positioning slot 31. One end of the first resilient piece 50 is fixed to the second rail 20, and another end of the first resilient piece 50 extends into the first clearance slot 23 and is bent toward the third rail 30.

When the first rail 10 slides out, the pulling tab 40 drives the first resilient piece 50 and the second rail 20 to slide outward. When the first resilient piece 50 moves to the positioning slot 31, the first resilient piece 50 is elastically bent and extends into the positioning slot 31. After the first resilient piece 50 extends into the positioning slot 31, the first resilient piece 50 is separated from the pulling tab 40, and the first resilient piece 50 is locked on a wall of the positioning slot 31.

The first rail 10 is provided with a first pushing block 13. A second pushing block 54 is located on the first resilient piece 50. When the first rail 10 slides inward, the first pushing block 13 pushes against the second pushing block 54 to drive the second rail 20 to slide inward.

It can be understood that in other embodiments, the first pushing block 13 and the second pushing block 54 can be omitted, and the second rail 20 can be slid inward by manually pushing.

Figure 3:
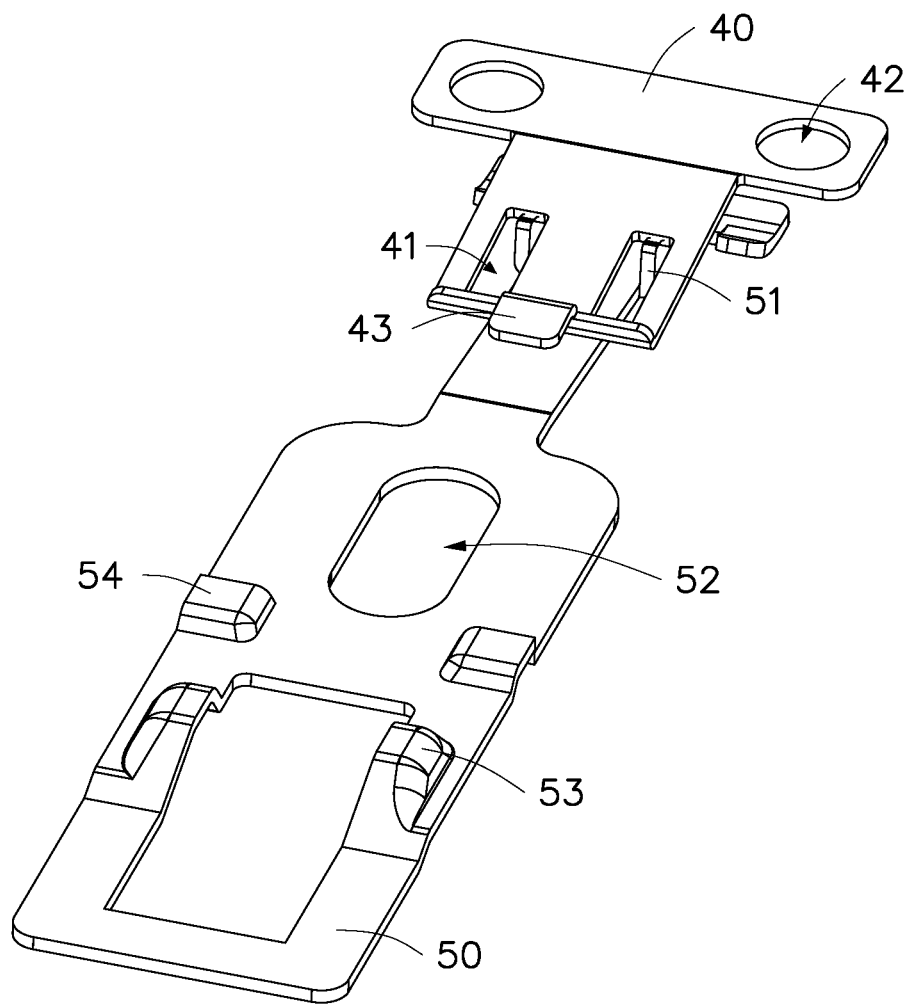
FIG. 3 is an isometric view of a first resilient piece and a pulling tab of the slide rail.

Referring to FIG. 3, the pulling tab 40 is provided with a driving hole 41. The first resilient piece 50 is provided with a protrusion 51. After the first rail 10 is pulled out, the pulling tab 40 moves along with the first rail 10, so that the driving hole 41 is sleeved on the protrusion 51 to drive the first resilient piece 50 and the second rail 20 to move outward together. After the second rail 20 is moved to the first resilient piece 50 aligning with the positioning slot 31, a free end of the first resilient piece 50 is elastically bent and protrudes into the positioning slot 31, and the protrusion 51 is disengaged from the driving hole 41 so that the first rail 10 can continue to move.

It can be understood that in other embodiments, the pulling tab 40 is provided with the protrusion 51, and the first resilient piece 50 is provided with the driving hole 41.

Figure 4:
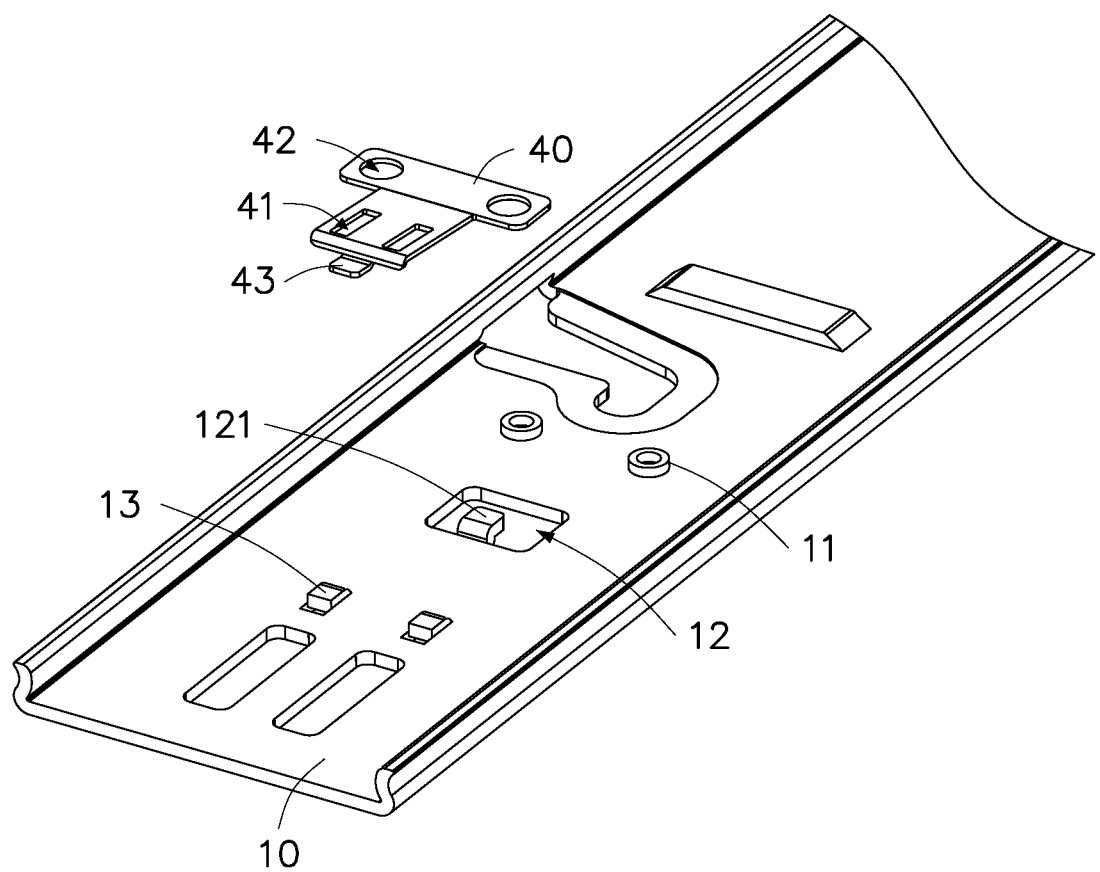
FIG. 4 is an exploded view of a first rail and the pulling tab.
Figure 5:
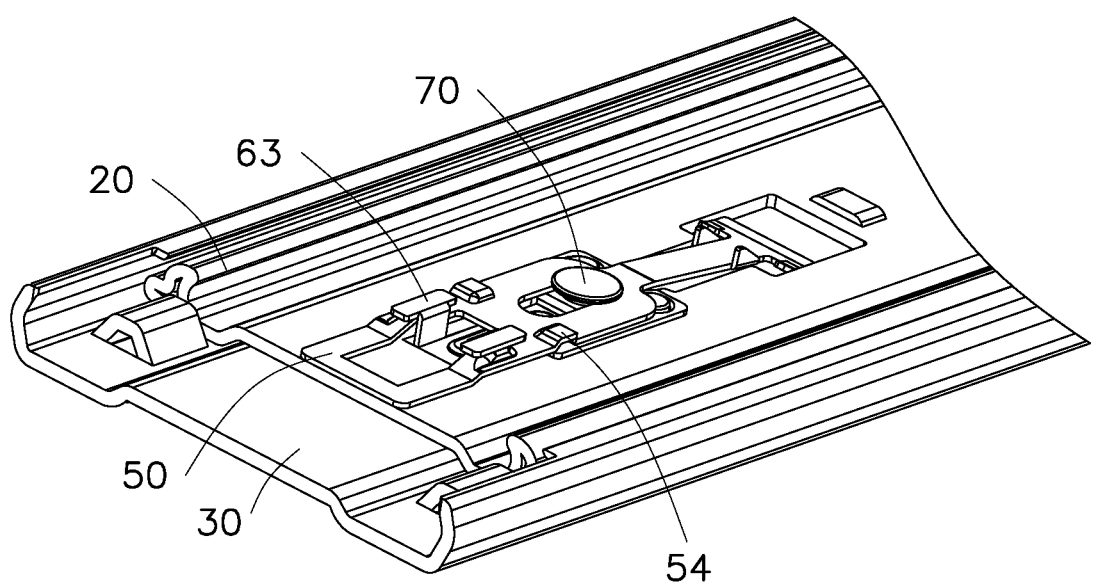
FIG. 5 is an assembled, isometric view of a second rail, the first resilient piece, the second resilient piece, and a third rail.

Referring to FIG. 4, the first rail 10 is provided with a through slot 12. One end of the first resilient piece 50 is fixed to the first rail 10, and another end of the first resilient piece 50 extends to the through slot 12. When the first resilient piece 50 is stressed, the first resilient piece 50 can extend into the through slot 12.

The first rail 10 is provided with a first hook 121. The pulling tab 40 is provided with a second hook 43. The first hook 121 is located above the through slot 12, and the second hook 43 extends between the through slot 12 and the first hook 121. The first hook 121 is configured to limit the second hook 43.

Figure 7:
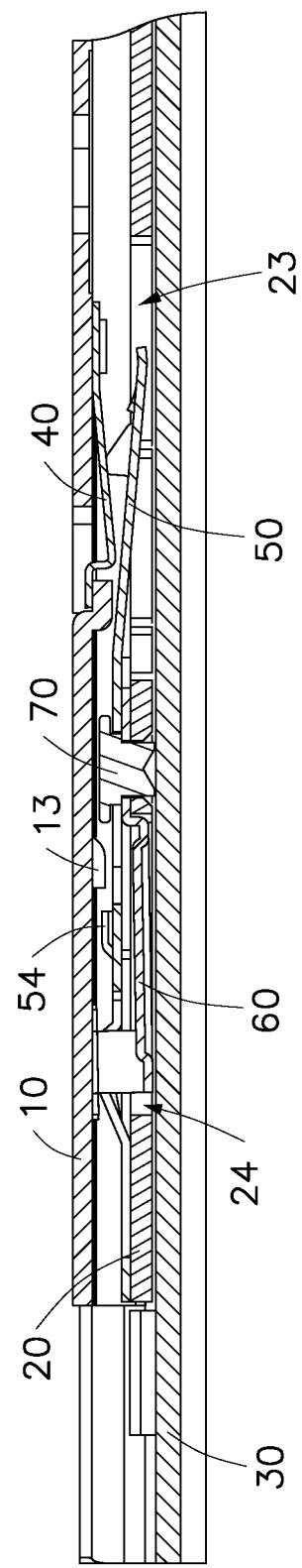
FIG. 7 is a cross-sectional view of the slide rail in a retracted state.
Figure 8:
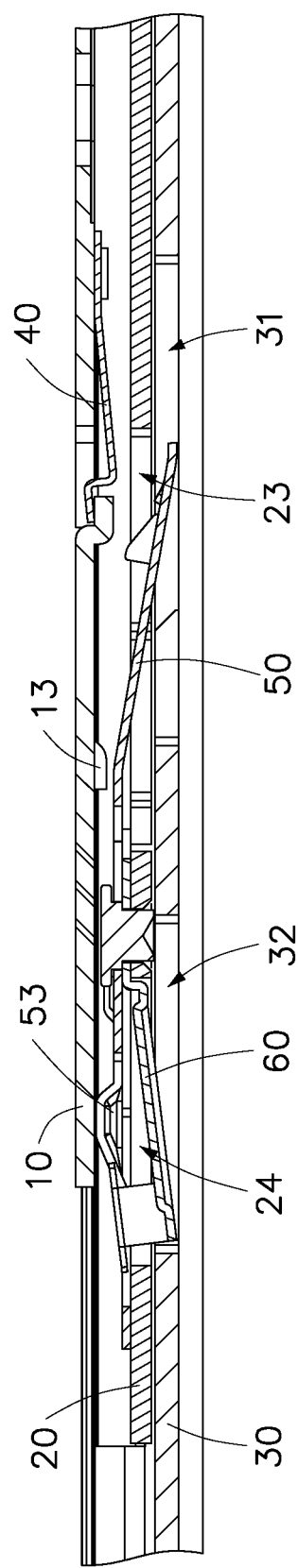
FIG. 8 is a cross-sectional view of the slide rail in an extended state.

Referring to FIG. 7 and FIG. 8, the protrusion 51 includes a vertical surface and a sloped surface. The vertical surface is on an inward side of the protrusion 51. When the first rail 10 moves outward, the wall of the driving hole 41 abuts the vertical surface of the protrusion 51 to pull the second rail 20. When the first rail 10 moves inward, the wall of the driving hole 41 abuts the sloped surface of the protrusion 51 to pass over the protrusion 51.

Referring to FIG. 2 and FIG. 6, the second rail 20 is further provided with a second clearance slot 24. A limiting slot 32 is further disposed on the third rail 30. The limiting slot 32 is located adjacent to the positioning slot 31 closer to a middle of the third rail 30. The slide rail 100 further includes a second resilient piece 60. The second resilient piece 60 is located on the second rail 20. One end of the second resilient piece 60 is fixed, and another end of the second resilient piece 60 is elastically bent and extends into the second clearance slot 24. In one embodiment, the first resilient piece 50 is slidably disposed on the second rail 20 and can slide under the second resilient piece 60 to disengage the second resilient piece 60 from the second clearance slot 24. In one embodiment, one end of the first resilient piece 50 away from the second resilient piece 60 protrudes into the positioning slot 31, and one end of the second resilient piece 60 away from the first resilient piece 50 protrudes into the second clearance slot 24.

It can be understood that in one embodiment, the first resilient piece 50 is only capable of sliding a small distance which does not affect movement of the first resilient piece 50 and the second rail 20 by the pulling tab 40. Specifically, the second resilient piece 60 is fixed to the second rail 20 by a fixing member 70. The first resilient piece 50 is provided with a sliding groove 52. The first resilient piece 50 is sleeved on the fixing member 70 through the sliding groove 52. The first resilient piece 50 is slidable until a wall of the sliding groove 52 is stopped by the fixing member 70.

In one embodiment, the first resilient piece 50 includes a first step 53, and the second resilient piece 60 includes a second step 63. After the first resilient piece 50 slides to move the first step 53 to a lower side of the second step 63, the first step 53 lifts the second step 63 to disengage the second resilient piece 60 from the second clearance slot 24.

Referring to FIG. 2, in one embodiment, one end of the third rail 30 away from a slide out direction of the first rail 10 is provided with a baffle 33 for limiting the first rail 10 and the second rail 20.

Referring to FIGS. 1-8, to extend the slide rail 100, the first rail 10 is pulled out, and the pulling tab 40 drives the first resilient piece 50 and the second rail 20 to slide outward. When the first resilient piece 50 is moved to the positioning slot 31, the first resilient piece 50 is elastically bent into the positioning slot 31. Meanwhile, the second resilient piece 60 is elastically bent into the limiting slot 32, and the second rail 20 is locked in place. After the first resilient piece 50 is inserted into the positioning slot 31, the resilient piece 50 is separated from the pulling tab 40, so that the first rail 10 can be continuously pulled out.

To contract the slide rail 100, the first rail 10 is pushed inward, and the pulling tab 40 is bent toward the through slot 12 by the sloped surface of the protrusion 51 to pass over the protrusion 51. Then, the first pushing block 13 of the first rail 10 is pushed against the second pushing block 54 of the first resilient piece 50 to drive the second rail 20 to slide inward.

The second rail 20 of the slide rail 100 is pulled by the cooperation of the pulling tab 40 and the first resilient piece 50, and the positioning slot 31 locks the second rail 20 and separates the first resilient piece 50 from the pulling tab 40. Thus, a structure of the slide rail 100 is simplified, and the slide rail 100 is stable in operation.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A slide rail comprising:
a first rail;
a second rail, the first rail slidably coupled to the second rail; and
a third rail, the second rail slidably coupled to the third rail; wherein:
the first rail comprises a pulling tab;
the second rail comprises a first resilient piece and a first clearance slot;
the third rail comprises a positioning slot;
one end of the first resilient piece is fixed to the second rail, and another end of the first resilient piece extends into the first clearance slot;
when the first rail slides out, the pulling tab drives the first resilient piece and the second rail to slide out;
when the first resilient piece is moved to the positioning slot, the first resilient piece resiliently bends and inserts into the positioning slot, and the first resilient piece is separated from the pulling tab;
wherein the first rail comprises a first pushing block, the first resilient piece comprises a second pushing block, when the first rail slides in, the first pushing block abuts the second pushing block to drive the second rail to slide in.

2. The slide rail of claim 1, wherein:
the pulling tab comprises a driving hole;
the first resilient piece comprises a protrusion;
when the protrusion inserts into the driving hole, the pulling tab pulls the first resilient piece to move; and
after the first resilient piece inserts into the positioning slot, the protrusion is separated from the driving hole.

3. The slide rail of claim 2, wherein:
the first rail comprises a through slot; and
one end of the pulling tab is fixed to the first rail, and another end of the pulling tab inserts into the through slot.

4. The slide rail of claim 2, wherein:
the pulling tab comprises a protrusion;
the first resilient piece comprises a driving hole;
when the protrusion inserts into the driving hole, the pulling tab pulls the first resilient member to move; and
after the first resilient piece inserts into the positioning slot, the protrusion is separated from the driving hole.

5. The slide rail of claim 3, wherein:
the first rail comprises a first hook;
the pulling tab comprises a second hook; and
when the first hook is moved to a position above the through slot, the second hook is inserted between the through slot and the first hook.

6. The slide rail of claim 5, wherein:
the first hook is configured to limit the second hook.

7. The slide rail of claim 3, wherein:
when the first rail is slid out, a wall of the driving hole abuts a vertical surface of the protrusion to pull the second rail; and
when the first rail is slid in, the wall of the driving hole abuts a sloped surface of the protrusion to pass over the protrusion.

8. The slide rail of claim 1, wherein:
the second rail comprises a second resilient piece and a second clearance slot;
the third rail comprises a limiting slot;
one end of the second resilient piece inserts into the second clearance slot;
the first resilient piece is slidably mounted on the second rail;

the first resilient piece is configured to slide under the second resilient piece to separate the second resilient piece from the second clearance slot;

after the first resilient piece slides away from the second resilient piece, the second resilient piece inserts into the limiting slot.

9. The slide rail of claim 8, wherein:

another end of the second resilient piece is fixed to the second rail by a fixing member;

the first resilient piece comprises a sliding groove; and the sliding groove is configured to sleeve over the fixing member.

10. The slide rail of claim 8, wherein:

the first resilient piece comprises a first step;

the second resilient piece comprises a second step;

after the first resilient piece slides to position the first step under the second step, the first step lifts the second step, and the second resilient piece is separated from the second clearance slot.

11. The slide rail of claim 8, wherein:

one end of the first resilient piece away from the second resilient piece inserts into the first clearance slot; and one end of the second resilient piece away from the first resilient piece inserts into the second clearance slot.

* * * * *